US009159198B2

(12) United States Patent
Moshal et al.

(10) Patent No.: US 9,159,198 B2
(45) Date of Patent: Oct. 13, 2015

(54) METHOD AND SYSTEM FOR PROVIDING ELECTRONIC MULTIPLAYER TOURNAMENTS WITH REAL-MONEY PRIZES DURING TOURNAMENT PLAY

(76) Inventors: Martin Paul Moshal, Queens Way Quay (GI); Theo Naicker, Durban (ZA)

( * ) Notice: Subject to any disclaimer, the term of this patent is extended or adjusted under 35 U.S.C. 154(b) by 1509 days.

(21) Appl. No.: 11/620,858

(22) Filed: Jan. 8, 2007

(65) Prior Publication Data

US 2008/0167117 A1 Jul. 10, 2008

(51) Int. Cl.
*A63F 13/00* (2014.01)
*G07F 17/32* (2006.01)

(52) U.S. Cl.
CPC ............ *G07F 17/3276* (2013.01); *G07F 17/32* (2013.01)

(58) Field of Classification Search
CPC .. G07F 17/32; G07F 17/3244; G07F 17/3276
USPC .......................................... 463/16–18, 40–42
See application file for complete search history.

(56) References Cited

U.S. PATENT DOCUMENTS 6,039,648 A * 3/2000 Guinn et al. .................... 463/16
6,887,152 B2 * 5/2005 Stanek ............................ 463/17
7,413,510 B2 * 8/2008 Schlegel et al. ................. 463/16
7,419,429 B2 * 9/2008 Taylor ............................. 463/25
2004/0242297 A1 12/2004 Walker et al.
2005/0043088 A1 2/2005 Nguyen et al.
2006/0205483 A1 * 9/2006 Meyer et al. .................... 463/25
2008/0045334 A1 * 2/2008 Shvili .............................. 463/27
2008/0108404 A1 * 5/2008 Iddings et al. .................. 463/16

FOREIGN PATENT DOCUMENTS

WO WO 03/083796 10/2003

OTHER PUBLICATIONS

European Search Report issued by the European Patent Office in European application No. 08 25 0069.
Examiner's First Report issued by the Australian Patent Office on May 19, 2009 on patent application No. 2008200060.

* cited by examiner

*Primary Examiner* — Ronald Laneau
*Assistant Examiner* — Ross Williams
(74) *Attorney, Agent, or Firm* — McDonnell Boehnen Hulbert & Berghoff LLP

(57) ABSTRACT

An electronic multiplayer tournament is provided in which participating players can win real-money prizes during tournament play, that is, prizes that can be redeemed for value outside of the context of the tournament prize, in addition to overall tournament prizes at the close of tournament play. The real-money prizes may include any one or more of a jackpot prize, a progressive jackpot prize or a wide-area progressive jackpot prize. A portion of a tournament entry fee can be utilized to fund the cost of the real-money prize, in direct proportion to the probability of the real-money prize being won by a participating player.

28 Claims, 6 Drawing Sheets

METHOD AND SYSTEM FOR PROVIDING ELECTRONIC MULTIPLAYER TOURNAMENTS WITH REAL-MONEY PRIZES DURING TOURNAMENT PLAY

BACKGROUND

The present application relates generally to electronic multiplayer tournaments involving games-of-chance like video slots, video poker and the like and, more particularly, to winning real-money prizes during such tournaments, in addition to or rather than, tournament prize money. Such electronic tournaments can be played on a computer workstation communicating over a computer network such as the Internet with a central gaming server. Such tournaments can also be played on a workstation taking the form of an electronic video gaming terminal that is installed in a casino-type environment, for example.

An electronic multiplayer tournament based on an underlying game-of-chance generally comprises a number of rounds, each round involving one or more instances of the game-of-chance (hereinafter, game) in which players participate. Depending on the type of game, each instance may involve one or more hands, turns, spins, or other wagering events during the game.

As one example, in an electronic multiplayer video slot tournament, each game instance typically may be a single virtual slot machine. Typically, a single player will play the virtual slot machine by wagering and spinning that single virtual slot machine. The single player competes along with other similarly situated players, who each play by wagering and spinning their associated virtual slot machines. Generally, each round consists of one or more spins, with a typical round involving a fixed time limit, a fixed number of spins (i.e., turns of the game), or both.

To participate in an electronic multiplayer tournament, a player is typically required to pay a tournament entry fee, of which a portion is a contribution to tournament prize money and the remaining portion being a fee for the organizers of the tournament. For example, if the prize money contribution is $40 and the tournament organizers' fee is $4, each player participating in the tournament is required to pay an entry fee of $44 to the tournament organizers in order to play. The prize money contributions from all the participating players in the tournament are pooled to form the tournament prize money.

At the start of the tournament, each participating player is provided with an identical quantity of tournament credit. This tournament credit may typically be used as counters to determine the ultimate winner(s) of the tournament. The tournament prize money is distributed among the top-placed finishers in the tournament. Each player consumes his tournament credit by making wagers on turns of the game. Any winnings arising from successful wagers during the player's turns of the game can be accounted for in two ways: the winnings may be credited back to the player's tournament credit balance or, alternatively, the winnings may be accumulated in a separate tournament winnings account associated with the player.

If there is more than one round in a tournament, the number of players in each successive tournament round is typically smaller than the number of players in each preceding round. In a video slots tournament, for example, at the end of a round, a predetermined number of players who have performed best during that round will proceed to the next round of the tournament, the remaining players being eliminated. The players who have performed best in any around are those having the top credit balances, either top tournament credit balances where winnings are credited back to players' tournament credit balances, or top winnings balances where winnings are accumulated in separate player tournament winnings accounts.

Ultimately, the number of surviving players is whittled down, round by round, until a sufficiently small number of players remain so that they are all "in-the-money," i.e., entitled to a share of the prize money. Once the surviving players in a tournament are all in-the-money, they can play out the tournament to the end to determine an overall winner. Generally, each player will collect a share of the prize money corresponding to that player's eventual finishing position.

It will be appreciated that, in the art, players who participate in online video slot tournaments are only eligible to win a share of the tournament prize money as described above. Any winnings arising out of play of the video slots game during the tournament cannot be redeemed for value since a player's tournament credit balance and, if applicable, a player's winnings balance are only used as counters to determine the ultimate winner(s) of the tournament and have no significance outside of the tournament itself.

SUMMARY

Disclosed herein are embodiments of a method and system for providing electronic multiplayer tournaments with real-money prizes during tournament play. In one embodiment, the method includes receiving a tournament entry fee from each player in the electronic multiplayer tournament, and allocating a portion of the tournament entry fee to real money prizes and tournament prize money. The method also includes awarding real money prizes and tournament prize money to one or more of the players according to rules of the electronic multiplayer tournament.

In another embodiment, the method includes receiving an indication of a receipt of tournament entry fee from each player in the electronic multiplayer tournament, allocating a portion of the tournament entry fee for overall tournament prize money, and allocating a portion of the tournament entry fee for real-money prizes awarded during tournament play. The method also includes during tournament play, identifying players in the electronic multiplayer tournament meeting requirements to receive a portion of the real-money prizes awarded during tournament play. The method further includes at the close of tournament play, identifying players in the electronic multiplayer tournament meeting requirements to receive a portion of the overall tournament prize money.

In still another embodiment, the method includes receiving an indication of a receipt of tournament entry fee from each player in the electronic multiplayer tournament, allocating a portion of the tournament entry fee from each player for overall tournament prize money, and allocating a portion of the tournament entry fee from each player for real-money prizes awarded during tournament play. The method also includes when a player makes a maximum wager amount during play of the electronic multiplayer tournament, making a contribution from the player's portion of the tournament entry fee allocated for real-money prizes awarded during tournament play to a jackpot prize. The method further includes at the close of the tournament play, returning remaining funds un-contributed to the jackpot prize from each player's portion of the tournament entry fee allocated for real-money prizes awarded during tournament play to each respective player.

In yet another embodiment, a server is provided for managing an electronic multiplayer tournament. The server includes a first program code for receiving a tournament entry fee from each player in the electronic multiplayer tournament, and a second program code for allocating a portion of the tournament entry fee to real money prizes and tournament prize money. The server also includes a third program code for awarding real money prizes and tournament prize money to one or more of the players according to rules of the electronic multiplayer tournament.

In still another embodiment, a system is provided for providing an electronic multiplayer tournament. The system includes electronic gaming devices and a server coupled through a communication network to the electronic gaming device. The electronic gaming devices present a display of game-play to players participating in multiplayer tournament games. The server manages the game-play of the multiplayer tournament games such that players participating in the multiplayer tournament games can win real-money prizes during tournament play in addition to overall tournament money prizes at the close of tournament play.

As described in embodiments below, the electronic multiplayer tournament is configured such that participating players can win real-money prizes during tournament play, that is, prizes that can be redeemed for value outside of the context of the tournament prize. The real-money prizes may include any one or more of a jackpot prize, a progressive jackpot prize or a wide-area progressive jackpot prize. It is anticipated that this would increase the attractiveness of such electronic multiplayer tournaments to players, causing more players to enter such tournaments, thus leading to tournaments offering greater prize money, thereby further increasing the attractiveness of such tournaments.

Other aspects of the present disclosure will become apparent from the following detailed description, taken in conjunction with the accompanying drawings, which illustrate, by way of example, certain principles of described embodiments.

DETAILED DESCRIPTION

In one embodiment described below, an electronic multiplayer tournament is provided in which participating players can win real-money prizes during tournament play, that is, prizes that can be redeemed for value outside of the context of the tournament prize. The real-money prizes may include any one or more of a jackpot prize, a progressive jackpot prize or a wide-area progressive jackpot prize. A portion of a tournament entry fee can be utilized to fund the cost of the real-money prize, in direct proportion to the probability of the real-money prize being won by a participating player. It is anticipated that this would increase the attractiveness of such electronic multiplayer tournaments to players, causing more players to enter such tournaments, thus leading to tournaments offering greater prize money, thereby further increasing the attractiveness of such tournaments.

Players participate in the electronic multiplayer tournament using distributed gaming workstations in which gameplay is managed by a central gaming server. U.S. patent application Ser. No. 10/513,140 discloses an example system whereby multiple distributed gaming workstations may engage in gaming activity via a central gaming server over a computer network such as the Internet. The entire contents of U.S. patent application Ser. No. 10/513,140 are incorporated by reference herein, as if fully set forth in this description. In one embodiment, the methods of the present application are implemented in a system of the type disclosed in the U.S. patent application Ser. No. 10/513,140 (published as U.S. Patent Application Publication No. 20060063593).

Figure 1:
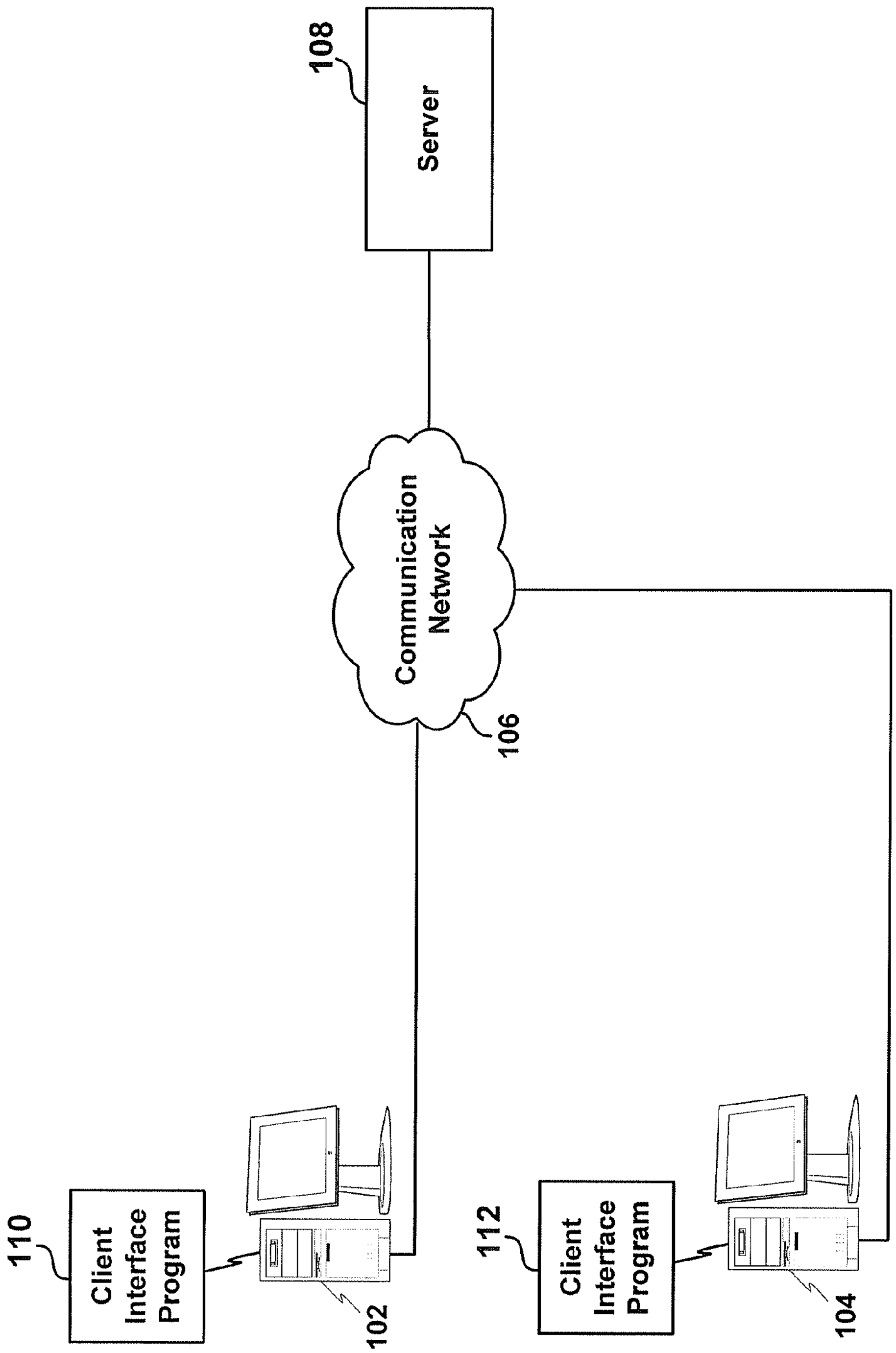
FIG. 1 is a block diagram illustrating one example of a system for providing an electronic multiplayer tournament to participants.

Particularly, referring now to FIG. 1, one example of a system for providing an electronic multiplayer tournament to participants is illustrated. The system includes electronic gaming devices 102 and 104 each coupled through a communication network 106 to a server 108. The electronic gaming devices 102 and 104 allow participants (or users, more generally) to play casino games by, for example, presenting the participant a display of game-play. In addition, the electronic gaming devices 102 and 104 may receive user input and transmit the user input through the communication network 106 (such as the Internet) to the server 108 via a wireline or wireless interface, for example. Thus, the electronic gaming devices 102 and 104 may be a slot machine at a live casino, for example, or a personal computer allowing a user to participate in online gaming. One skilled in the art of computer systems will understand that the example embodiments are not limited to any particular class or model of computer employed for the electronic gaming devices 102 and 104 and will be able to select an appropriate system. Further, of course, more electronic gaming devices may be coupled to the server and may allow more players to participate in casino gaming as well.

In one embodiment, the system illustrated in FIG. 1 may be in the form of an online casino, and in that instance, the electronic gaming devices 102 and 104 are client workstations and the server 108 is a gaming server remote from the electronic gaming devices 102 and 104, but linked thereto by the communication network 106, such as the Internet. One or more casino games are then executable by selection of a user of the online casino. Each game offered by the casino includes a server process, which is executable in the gaming server, and a client process, which is executable in the client workstation. The server process generates, upon request of the client process, one or more random events upon which an outcome of the casino game depends. Such random events can correspond, for example, to the roll of a die, the spin of a roulette wheel or the deal of a playing card, depending on which particular casino game is being played by the player. The client process, on the other hand, presents to the user or player a simulation of the casino game being played. The client process also enables the player to place wagers on, and to control the progress of, the casino game, and displays to the player the outcome of the game as a function of the random events generated by the server process.

In order to communicate with the gaming server of the online casino, the electronic gaming devices 102 and 104 operate under control of casino client interface programs 110 and 112. The client interface programs 110 and 112 include a menu subsystem or menu selection system that displays to the player a menu of casino games that are offered by the particular online casino. The electronic gaming devices 102 and

104 may present a graphical user interface ("GUI") including the menu selection system to the players. The players are then able to select any one of the games that they wish to play. When selecting a particular game for the first time, the casino client interface programs 110 and 112 cause a software program corresponding to the client process for the particular casino game to be downloaded from the gaming server 108 to the electronic gaming devices 102 and 104, where the program is stored locally on a storage device, such as a hard disk drive. Once downloaded, the player can then install the software program on the electronic gaming devices 102 and 104. Once the client process for a particular casino game has been downloaded and installed in this manner, the casino game can be played without the necessity for a further download.

In one particular menu selection system, a list of games that are available for play at an online casino is displayed to the player as an unstructured, tiled display of individual game display windows. Each game display window includes a name of a corresponding game, as well as salient details and rules associated with the game. Where a client process associated with a particular game has not yet been downloaded from the gaming server 108 to the electronic gaming devices 102 and 104, the corresponding game display window in the menu subsystem includes an icon that can be activated by the player to initiate a download of the corresponding client process from the gaming server 108 to the electronic gaming devices 102 and 104.

The server 108 may categorize each one of the different casino games available on the server 108 into one or more different categories. Examples of such categories include, for example, progressive jackpot games, table games, video poker games, slots games, and new games that have not previously been accessible through the menu system. The categorization can also include other categories of casino games, namely favorites, which are games that are preferred by the player, and recommended games. Any casino game can be categorized into more than one different category. For example, a particular game may be classified as a video poker game, as well as being categorized as a jackpot game. The client interface programs 110 and 112 can then present the menu selection system including the categorized casino games to the user using any type of GUI or other display techniques.

Many of the games presented by the client interface programs 110 and 112, such as video slots and video poker, generally have a pay table comprising one or more game outcomes, each that have a corresponding payout for a wager on the game. The payouts are generally inversely proportional to the probability of occurrence of the game outcomes, the top payout being commonly referred to as a jackpot prize. The jackpot prize may be a fixed amount or may be a progressive jackpot prize which is funded by a predetermined portion of each eligible wager made by a player of the game. The progressive jackpot prize may be funded by wagers of players playing the game at a single establishment, or may be a wide area progressive jackpot prize that is funded by wagers of players playing the same game at competing establishments. Examples of the operation of wide area progressive jackpot games are disclosed in U.S. patent application Ser. No. 10/532,850, which is entirely incorporated herein by reference, as if fully set forth in this disclosure.

Players may also participate in tournament games, which comprise a multiplayer game. Each participating player in a tournament game is presented with an identical graphical user interface (GUI) on his respective electronic gaming device. The GUI presents to the player a suitable display of game-play with appropriate activatable icons that enable the player to make his own desired game play decisions and to monitor the progress of the multiplayer game by viewing the game play decisions of the other participating players in the same instance of the game.

The server 108 monitors and controls game play within a multiplayer wagering tournament game. For example, the server 108 may operate a clearing account facility that has a clearing account corresponding to each online casino website or casino game to which the server 108 corresponds. Analogously, each online casino website or casino game may include a corresponding credit account facility with a credit account corresponding to each player who participates in a game offered by the online casino. To participate in the electronic multiplayer tournament, the player is required to pay a tournament entry fee, of which a portion is a contribution to tournament prize money and the remaining portion being a fee for the organizers of the tournament. The prize money contributions from all the participating players in the tournament are pooled to form the tournament prize money.

The server 108 can manage receipt of the tournament entry fee from the player by debiting the individual credit account of the player by an amount equivalent to the tournament entry fee. Upon debiting the player's credit account, the server 108 may receive an indication of receipt of the tournament entry fee from the player. Each player may fund their associated credit account prior to their participation in the game. For this purpose, each online casino, casino game, or the server 108 may include credit-dispensing means (not shown) capable of dispensing credit to any player who wishes to participate in the game. The player may purchase credit by means of conventional credit or debit card payment facilities that are well known in the art and which will not be described here in detail. Whenever a player purchases credit from the credit-dispensing means, the corresponding online casino or server 108 credits that player's credit account with an amount equivalent to the quantity of credit purchased by the player.

At the start of the tournament, each participating player is provided with an identical quantity of tournament credit, which is used as counters to determine the ultimate winner(s) of the tournament. The tournament credit is "play money" that the players use to make wagers in the tournament. Loss of tournament credit or play money does not result in a loss of actual real-money by the players. When a player enters a tournament, the only real-money that the player can lose through participation and wagering is the tournament entry fee. Thus, the tournament credit is referred to as play money, because the tournament credit has a feel as being real-money, however, the tournament credit has no actual money value aside from having a seat in the tournament.

Tournaments can take many forms involving many different games and varying lengths. Within a typical slots tournament, for example, players may play as much as desired over a certain time period (e.g., during the course of a month), or players may play as much as desired for a set time period (e.g., 90 minutes, and possibly players can divide the time into intervals to play the 90 minutes over the course of a few days). Players attempt to win more play money than everyone else in the tournament, or to win at least enough play money to rank in the top three, for example, to be eligible for prize money. The tournament prize money is usually distributed among the top-placed finishers in the tournament.

Players can typically stop playing whenever desired and do not have to use up the full time allotment. For example, players can view a leader board to determine their ranking, and may wish to stop playing when they are sufficiently ahead in the rankings so as not to risk losing credits or play money. Each player consumes his tournament credit (e.g., play money) by making wagers on turns of the game. If there is more than one round in a tournament, the number of players in each successive tournament round is typically smaller than the number of players in each preceding round. In a video slots tournament, for example, at the end of a round, a predetermined number of players who have performed best during that round will proceed to the next round of the tournament, the remaining players being eliminated. The players who have performed best in any around are those having the top credit balances, either top tournament credit balances where winnings are credited back to players' tournament credit balances, or top winnings balances where winnings are accumulated in separate player tournament winnings accounts.

Ultimately, the number of surviving players is whittled down, round by round, until a sufficiently small number of players remain so that they are all "in-the-money," i.e., entitled to a share of the prize money. In embodiments described below, participating players in the electronic multiplayer tournament can also win real-money prizes during tournament play, in addition to or rather than, money prizes for being deemed in the money. That is, prizes that can be redeemed for value outside of the context of the tournament prize. The real-money prizes may include any one or more of a jackpot prize, a progressive jackpot prize or a wide-area progressive jackpot prize. A jackpot prize may refer to accumulated stakes pertaining to one game at an online casino, or other types of cumulatively pooled winnings possibly from multiple games at an online casino. The jackpot payout may also be the top prize or reward for winning a particular game or portion of a game at an online casino. A progressive jackpot prize (or wide-area progressive jackpot prize) then refers to a prize accumulated from games that are networked between a plurality of casinos, and any player participating at any of the networked casinos may win the progressive jackpot, irrespective of the casino from which that player plays the progressive game.

Figure 2:
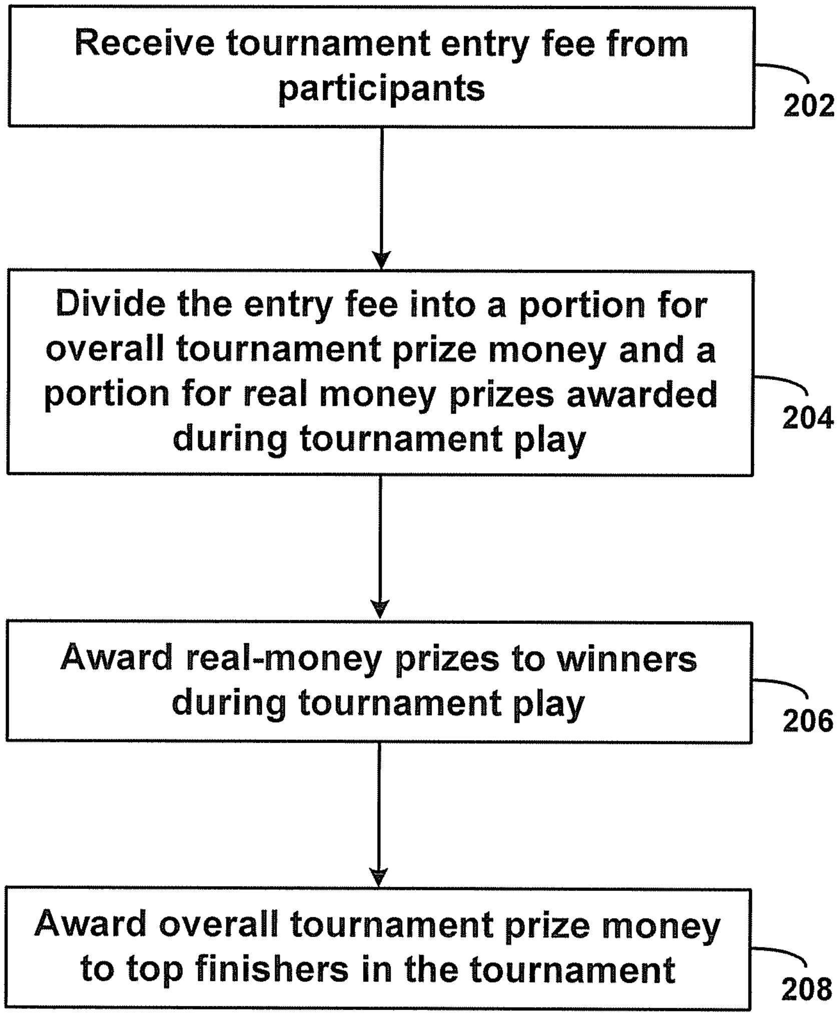
FIG. 2 is a flowchart depicting examples of functional steps for performing a tournament according to the present application.

FIG. 2 is a flowchart depicting functional steps for performing a tournament according to one possible embodiment. Initially, each participant in a tournament will pay an entry fee, as shown at block 202. The entry fee will cover the participant's contribution to the prize money as well as the fee paid to an organizer of the tournament. Next, as shown at block 204, prize money is formed from the entry fee by dividing the entry fee into two portions: one portion for overall tournament prize money, and another portion for real-money prizes awarded during tournament play. The money prizes awarded during tournament play are paid out to winners via any one or more of jackpots, progressive jackpots, or wide-area progressive jackpots as shown at block 206. The overall tournament prize money is paid out to the top finishers in the tournament, as shown at block 208.

The Examples below describe various embodiments for performing the tournament as described in FIG. 2.

Example 1

A Slots Tournament Based on a Wide-Area Progressive Jackpot Game

Consider a slots tournament in which all participating players play a wide-area progressive jackpot slots game having the following characteristics:

| | |
|---|---|
| 1. Coin size: | $1 |
| 2. Maximum wager size: | 3 coins ($3 play money) |
| 3. Progressive jackpot can only be won with a wager of maximum size | |
| 4. Progressive Contribution: | 6% of wager |

The slots tournament has the following parameters:

| | |
|---|---|
| 1. Tournament entry fee: | $50 |
| 2. Tournament credit ($1 coin size) | 300 credits (i.e. $300 of play money) |
| 3. Tournament organizer's fee | $5 |
| 4. Tournament is time-limited | |
| 5. The progressive jackpot prize is a real-money prize for the player. | |

The 300 tournament credits will potentially allow a player to play up to 100 maximum-wager turns of the progressive slots game and be eligible to win the progressive tournament prize. The progressive contribution per maximum wager is ($3 value of play money)×6%=$0.18 real-money. Every time a player makes a maximum wager of 3 coins, $0.18 of his entry fee is contributed to the progressive jackpot. Thus, the 100 potential maximum-wager turns of the progressive slots game will require a maximum progressive contribution of 100×$0.18=$18 real money.

In this instance, the $50 entrance fee is divided as follows:

| | |
|---|---|
| Tournament organizer's fee: | $5 |
| Progressive contribution fee: | $18 |
| Prize Money contribution: | $50 − $18 − $5 = $27 |

Figure 3:
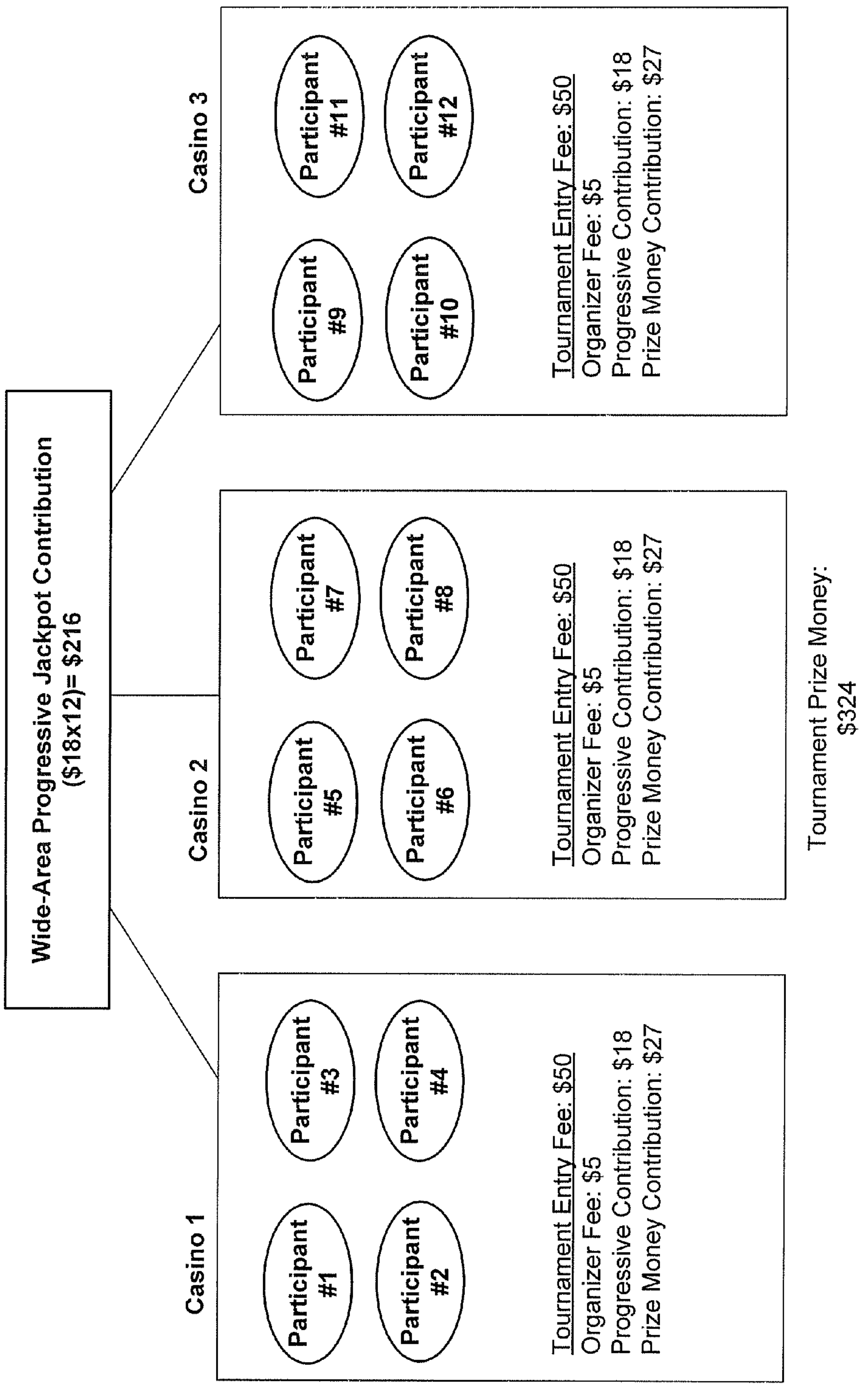
FIG. 3 conceptually illustrates a slots tournament configured according to the present application.

FIG. 3 conceptually illustrates a slots tournament setup based on a wide-area progressive jackpot slots game as described above. The slots tournament has a total of 12 participants playing the same wide-area progressive slots game from each of three different online casinos, with four participants at each online casino. Each participant has paid the $50 entry fee. For the tournament as a whole, there is a total of $324 (i.e., $27×12) tournament prize money that will be paid out to the top finishers of the tournament (the participants with the highest scores or play money accumulations). For example, the top three finishers in the tournament may win 65%, 25% and 10% of the tournament prize money, respectively. Thus, in this example, the top finisher is awarded $210.60 (i.e. 65%×$324) of the tournament prize money, the runner-up is awarded $81 (i.e. 25%×$324) and the third-place finisher is awarded $32.40 (i.e. 10%*$324). Of course, the tournament prize money can be divided up amongst the participants in many other manners as well. For example, the top finisher may be awarded the entire $324 tournament prize money.

In addition, if each participant makes the maximum contribution of $18 to the progressive jackpot during the course of the tournament, the participants will, collectively, increase the wide-area progressive jackpot by $216 (i.e. 12×$18). At any time during the tournament the wide-area progressive jackpot may, of course, be much larger than $216 as non-tournament players may also have played the wide-area progressive game, and hence contributed to the wide-area progressive jackpot, either prior to the commencement of the tournament or during the duration of the tournament. The tournament could also terminate without the wide-area progressive jackpot having been won, either by a tournament participant or a non-tournament player. It is anticipated that the chance of winning large wide-area progressive jackpots (of several hundreds of thousands or even millions of dollars) during conventional tournament play will attract more participants to a multiplayer tournament than would otherwise be the case.

Figure 4:
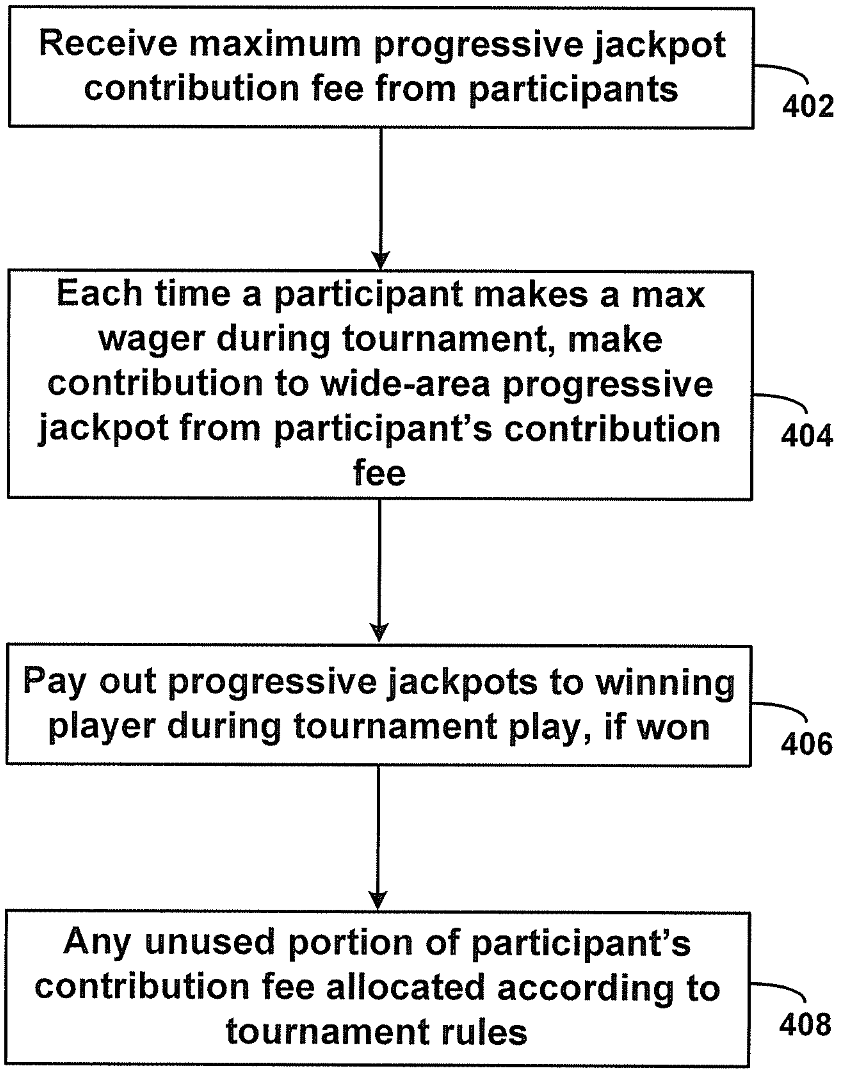
FIG. 4 is a flowchart depicting examples of functional steps for managing a progressive contribution fee of each participant.

FIG. 4 is a flowchart depicting functional steps for one example of managing the progressive contribution fee of each participant. The maximum progressive contribution fee ($18) for each participant is received and held by the tournament's organizer, as shown at block 402. Every time the player makes a maximum-size wager on the wide-area progressive jackpot slots game during the course of the tournament, a contribution of $0.18 is made by the tournament organizer from the player's progressive contribution fee to the wide-area progressive jackpot, as shown at block 404. During tournament play, in the event of a successful maximum-wager bet, the wide-area progressive jackpot is paid out to the winning player, as shown at block 406.

If the player uses all his play money to play the full quota of maximum-wager turns of the progressive slots game, the player's entire $18 progressive contribution fee will have been reduced to zero by the end of the tournament. During the course of the tournament, however, the player may also elect not to play the full quota of maximum-wager turns of the progressive slots game, choosing instead to play one or more turns of the game with reduced wagers, in this example by making $1 or $2 wagers. In such an instance, at the end of the tournament, a portion of the player's $18 progressive contribution fee that has been set aside will remain unutilized at the end of the tournament. This unused portion of the player's progressive contribution fee can be dealt with in a number of ways, as shown at block 408. For example, the unused portion can be retained by the tournament organizer, returned to the player, or added to the overall tournament prize money.

A successful spin of the slot machine causing the player to win the wide area progressive jackpot will, besides the real-money progressive jackpot payout, also have an equal tournament credit payout in the context of the tournament. Thus, during tournament play, the player can win real-money via the progressive jackpot payout, and win tournament credits to advance in the tournament rankings for a chance to win a portion of the tournament prize money.

Figure 5:
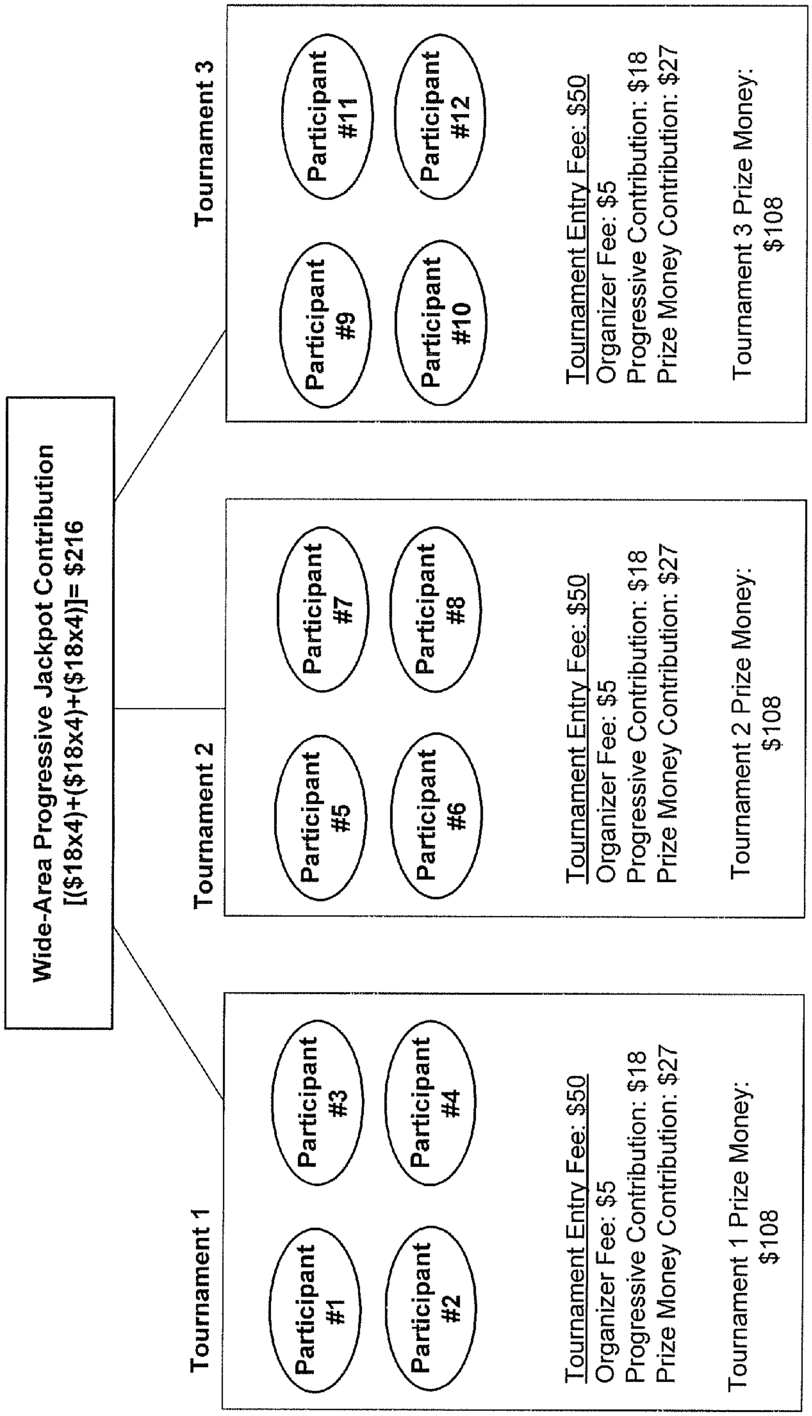
FIG. 5 conceptually illustrates three separate example slots tournaments configured according to the present application.

FIG. 5 illustrates a variation of the slots tournament of FIG. 3. In this variation, three separate slots tournaments are setup as described above, each played at a separate online casino. All participants in each of the three tournaments play the same wide-area progressive slots game. Each tournament has four participants, who have all paid the $50 tournament entry fee. For each tournament, there is a total of $108 (i.e. $27×4) tournament prize money that will be paid out to the top finishers of that tournament. For example, because of the small number of participants, only the top finisher of the tournament may win a share of the tournament prize money. Thus, in this example, the top finisher in each of the three tournaments will be awarded the entire $108 prize money for that tournament.

In addition, if each participant in all of the tournaments makes the maximum contribution of $18 to the progressive jackpot during the course of the tournaments, the participants will, collectively, increase the wide-area progressive jackpot by $216 [i.e. (4×$18)+(4×$18)+(4×$18)]. At any time during the tournaments the wide-area progressive jackpot may, of course, be much larger than $216 as non-tournament players may also have played the wide-area progressive game, and hence contributed to the wide-area progressive jackpot, either prior to commencement of the tournaments or during the duration of the three tournaments.

The three tournaments described with reference to FIG. 5 need not have the same tournament parameters, and may have different numbers of participants. For example, tournaments 1, 2 and 3 could have six, twelve and eight participants, respectively. In addition, the three tournaments may provide participants with play money of $150, $300 and $240, respectively. In this example, the respective progressive contribution fees per participant for each tournament would be $9 [i.e ($150/$3)×$0.18], $18 [i.e. ($300/$3)×$0.18] and $14.40 [i.e. ($240/$3)×$0.18], resulting in respective prize money contributions per participant of $36 (i.e. $50−$9−$5), $27 (i.e. $50−$18−$5) and $30.60 (i.e. $50−$14.40−$5). If every participant in each tournament makes the maximum contribution to the progressive jackpot, the participants will, collectively, increase the wide-area progressive jackpot by $385.20 [i.e. (6×$9)+(12×$18)+(8×$14.40)].

Figure 6:
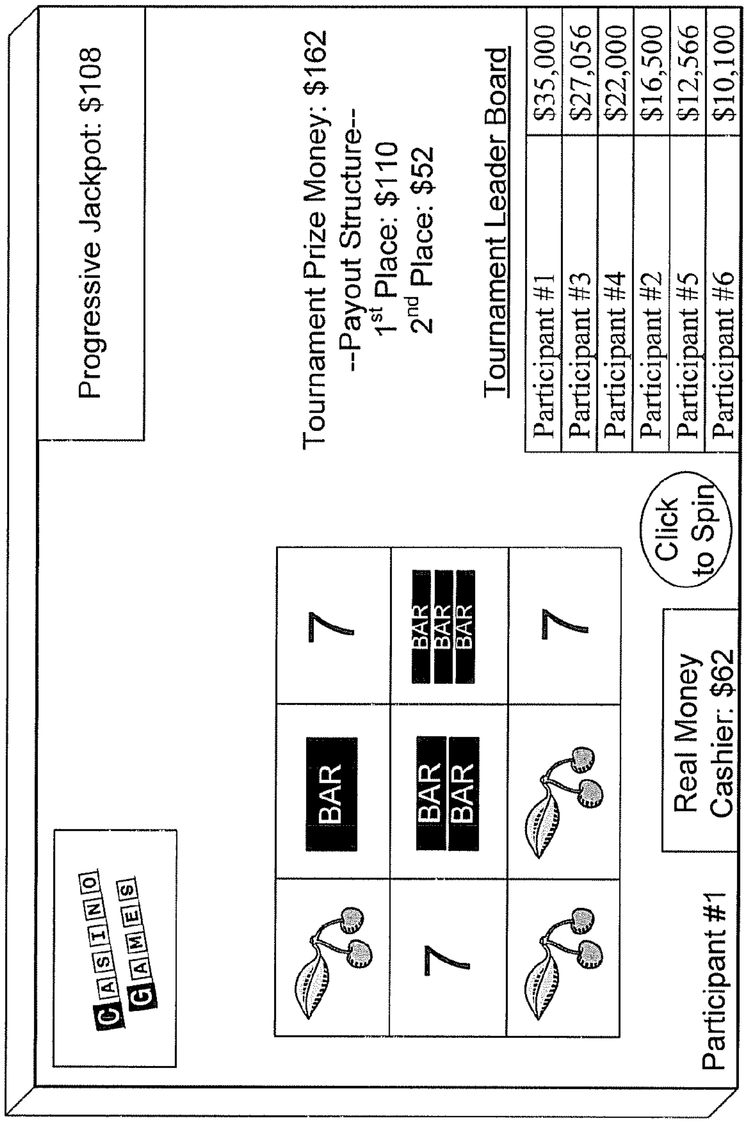
FIG. 6 illustrates one example of a GUI screenshot for a participant of the slots tournament.

FIG. 6 illustrates one example of a GUI screenshot for a participant of the slots tournament. In this example, a slots tournament being performed includes six participants, with a typical three reel slot screen interface, as shown. Each participant has paid the $50 entry fee, as described above, so that the total tournament prize money to be awarded is ($27×6)=$162. In addition, it is presumed that each participant will make the maximum number of max-wagers so that the progressive jackpot will reach a total of ($18×6)=$108, assuming no additional non-tournament play of the underlying three-reel slot game.

The GUI shows a leader board detailing the current rankings of the participants in the tournament. The money amounts shown in the leader board do not correspond to real money, but rather credits or play money to indicate who is winning the tournament. Participant #1 is currently winning, and may choose to sit out the remainder of the tournament, or risk losing credits by continuing play. For this tournament, because there are only six participants, only the top two leaders at the end of tournament play will receive a portion of the tournament prize money, namely $110 to first place and $52 to second place. However, each participant has an opportunity to win the entire progressive jackpot during tournament play, as described above. The player's current real money credit balance is shown below the slot reels, namely $62. According to typical progressive jackpot payouts, if the progressive jackpot is not won by the end of tournament play, the progressive jackpot carries over to further play of the three reel slot game, whether tournament play or non-tournament play

Example 2

A Slots Tournament Based on a 3-Reel Fixed Jackpot Game

Consider a slots tournament in which all participating players play a 3-reel fixed jackpot slots game having the following characteristics:

1. Coin size: $1
2. Maximum wager size: 3 coins ($3 play money)
3. Slots game pay table:

| Result | Wager 1 Coin | Wager 2 Coins | Wager 3 Coins | Payout Contribution |
|---|---|---|---|---|
| 3 × Blue 7 | 800 | 1600 | 2500 | 5% of wager |
| 3 × Red 7 | 80 | 160 | 240 | 2% of wager |
| 3 × Any 7 | 40 | 80 | 120 | 3% of wager |
| 3 × Bar 3 | 30 | 60 | 90 | n/a |

-continued

1. Coin size: $1
2. Maximum wager size: 3 coins ($3 play money)
3. Slots game pay table:

| Result | Wager 1 Coin | Wager 2 Coins | Wager 3 Coins | Payout Contribution |
|---|---|---|---|---|
| 3 × Bar 2 | 20 | 40 | 60 | n/a |
| 3 × Bar 1 | 10 | 20 | 30 | n/a |
| 3 × Cherry | 10 | 20 | 30 | n/a |
| 3 × Any Bar | 5 | 10 | 15 | n/a |
| Any 2 Cherry | 5 | 10 | 15 | n/a |
| Any 1 Cherry | 2 | 4 | 6 | n/a |

The slots game pay table above corresponds to slot games that have 3-reels, and each reel has a number of possible outcomes. For example, a reel may show a red 7, a blue 7, a single Bar, a double Bar, a triple Bar, or a cherry. Other reel symbols are possible as well.

In this example, a player may win real-money during tournament play by receiving any of the top three results from the slots game pay table. The player will win the amount of real-money corresponding to the wager amount and the slot machine reel result, as reflected in the pay table above.

The slots tournament has the following parameters:

| | |
|---|---|
| 1. Tournament entry fee: | $50 |
| 2. Tournament Credit ($1 coin size): | 300 credits (i.e. $300 of play money) |
| 3. Tournament Organizer's Fee: | $5 |
| 4. Tournament is time-limited | |
| 5. The top three payouts in the pay table are real-money prizes for the player. | |

The 300 tournament credits will potentially allow the player to play up to 100 maximum-wager turns of the fixed jackpot slots game and be eligible to win any of the top three payouts in the pay table. The top three payouts in the pay table require a combined contribution of 5%+2%+3%=10% of each wager. The top three payouts in the pay table require a contribution per maximum wager of $3×10%=$0.30. Thus, the 100 potential maximum-wager turns of the fixed jackpot slots game during the tournament will require a maximum payout contribution of 100×$0.30=$30.

In this instance, the $50 entrance fee is divided as follows:

| | |
|---|---|
| Tournament organizer's fee: | $5 |
| Payout contribution fee: | $30 |
| Prize Money contribution: | $50 − $30 − $5 = $15 |

The payout contribution fee is held by the tournament organizer and is used to fund any real-money payouts won by any tournament participants. If the player uses all his tournament credits to play the full quota of maximum-wager turns of the progressive slots game, the $30 payout contribution fee will have been fully utilized by the end of the tournament. The player may also elect not to play the full quota of maximum-wager turns of the fixed jackpot slots game, choosing instead to play one or more turns of the game with reduced wagers, in this example by making $1 or $2 wagers. In such an instance, at the end of the tournament, a portion of the $30 payout contribution fee will remain unutilized at the end of the tournament, since a turn of the game with a $1 or $2 wager only requires a payout contribution of $0.10 and $0.20, respectively. This unused portion of the payout contribution fee can be dealt with in different ways: for example, it can be retained by the tournament organizer, or may be added to the tournament prize money. It will be appreciated that any top three real money payout arising from a $1 or $2 dollar wager will be proportionally reduced relative to that for a maximum wager, as shown in the above pay table. Each top three result achieved by a player will, besides the real-money payout during tournament play, also have an equal tournament credit payout in the context of the tournament to advance the player in the tournament rankings for a chance to win a portion of the tournament prize money.

It will be appreciated that the slots tournament may have different parameters than those described above. For example, the tournament may only allow a player to make maximum wagers. Further, the tournament may be held with only the top payout in the pay table as a real-money payout. In this instance, the contribution required would be 5%, meaning a contribution of $0.15 per maximum wager, and a payout contribution fee of $15.

Example 3

A Slots Tournament Based on a 3-Reel Fixed Jackpot Game with "Free Play" Feature Consider a slots tournament in which all participating players play a 3-reel fixed jackpot slots game having the following characteristics:

1. Coin size: $1
2. Maximum wager size: 3 coins
3. Slots game pay table:

| Result | Wager 1 Coin | Wager 2 Coins | Wager 3 Coins | Payout Contribution |
|---|---|---|---|---|
| 3 × Blue 7 | 800 | 1600 | 2500 | n/a |
| 3 × Red 7 | 80 | 160 | 240 | n/a |
| 3 × Any 7 | 40 | 80 | 120 | n/a |
| 3 × Bar 3 | 30 | 60 | 90 | n/a |
| 3 × Bar 2 | 20 | 40 | 60 | n/a |
| 3 × Bar 1 | 10 | 20 | 30 | n/a |
| 3 × Cherry | 10 | 20 | 30 | n/a |
| 3 × Any Bar | 3 free plays | 6 free plays | 10 free plays | 10% of wager |
| Any 2 Cherry | 5 | 10 | 15 | n/a |
| Any 1 Cherry | 2 | 4 | 6 | n/a |

4. During a free plays phase of the slots game, in which the player is not required to make any additional wagers, the following secondary (or "free plays") pay table applies:

| Result | Payout (real money) |
|---|---|
| 3 × Blue 7 | 2500 |
| 3 × Red 7 | 240 |
| 3 × Any 7 | 120 |
| 3 × Bar 3 | 90 |
| 3 × Bar 2 | 60 |
| 3 × Bar 1 | 30 |
| 3 × Cherry | 30 |
| 3 × Any Bar | 10 free plays |
| Any 2 Cherry | 15 |
| Any 1 Cherry | 6 |

The slots tournament has the following parameters:

| | |
|---|---|
| 1. Tournament entry fee: | $50 |
| 2. Tournament credits ($1 coin size): | 300 credits (i.e. $300 of play money) |
| 3. Tournament Organizer's Fee: | $5 |
| 4. Tournament is time-limited | |
| 5. During a free plays phase of the slots game, all payouts are real-money prizes. | |

The 300 tournament chips will potentially allow the player to play up to 100 maximum-wager turns of the fixed jackpot slots game and be eligible to win a number of free plays of the game during which the player can win real-money prizes. The free plays phase of the game accounts for 10% of the payout of the underlying slots game, requiring a contribution per maximum wager of $3×10%=$0.30. Thus, the 100 potential maximum-wager turns of the fixed jackpot slots game during the tournament will require a maximum free plays contribution of 100×$0.30=$30.

In this instance, the $50 entrance fee is divided as follows:

| | |
|---|---|
| Tournament organizer's fee: | $5 |
| Free plays contribution fee: | $30 |
| Prize Money contribution: | $50 − $30 − $5 = $15 |

The free plays contribution fee is held by the tournament organizer and is used to fund any real-money payouts won by players participating in the tournament. If a player uses all his tournament credits to play the full quota of maximum-wager turns of the progressive slots game, the $30 free plays contribution fee will have been fully utilized by the end of the tournament. The player may also elect not to play the full quota of maximum-wager turns of the fixed jackpot slots game, choosing instead to play one or more turns of the game with reduced wagers, in this example by making $1 or $2 wagers. In such an instance, at the end of the tournament, a portion of the $30 free plays contribution fee will remain unutilized at the end of the tournament, since a turn of the game with a $1 or $2 wager only requires a contribution of $0.10 and $0.20, respectively. This unused portion of the free plays contribution fee can be dealt with in different ways: for example, it can be retained by the tournament organizer, or may be added to the tournament prize money. It will be appreciated that the number of free plays arising from a $1 or $2 dollar wager will be proportionally reduced relative to that for a maximum wager, as shown in the above pay table. Each top winning result achieved by a player during a free plays phase of the game will, besides the real-money payout, also have an equal tournament credit payout in the context of the tournament to advance the player in the tournament rankings for a chance to win a portion of the tournament prize money.

It will be appreciated that the slots tournament may have different parameters to those described above. For example, the tournament may only allow a player to make maximum wagers. Furthermore, the tournament may provide for one or more additional real-money payouts outside of the free plays phase of the game.

Example 4

A Slots Tournament Based on a 3-Reel Fixed Jackpot Game with "Bonus Game" Feature Consider a slots tournament in which all participating players play a 3-reel fixed jackpot slots game having the following characteristics:

1. Coin size: $1
2. Wager size: 3 coins
3. Slots game pay table:

| Result | 3 Coins | Payout Contribution |
|---|---|---|
| 3 × Blue 7 | 2500 | n/a |
| 3 × Red 7 | 240 | n/a |
| 3 × Any 7 | 120 | n/a |
| 3 × Bar 3 | 90 | n/a |
| 3 × Bar 2 | 60 | n/a |
| 3 × Bar 1 | 30 | n/a |
| 3 × Cherry | 30 | n/a |
| 3 × Any Bar | Bonus Play | 10% of wager |
| Any 2 Cherry | 15 | n/a |
| Any 1 Cherry | 6 | n/a |

4. During a bonus play phase of the slots game, in which the player is not required to make any additional wager, the player selects one item from n displayed items and wins a randomly-generated payout.

The slots tournament has the following parameters:

| | |
|---|---|
| 1. Tournament entry fee: | $50 |
| 2. Tournament credit ($1 coin size): | 300 (i.e. $300 of play money) |
| 3. Tournament Organizer's Fee: | $5 |
| 4. Tournament is time-limited | |
| 5. During all bonus play phases of the slots game, payouts are real-money prizes. | |

The 300 tournament chips will potentially allow the player to play up to 100 turns of the fixed jackpot slots game and be eligible to win a number of bonus play phases of the game during which the player can win real-money prizes. The bonus play phase of the game accounts for 10% of the payout of the underlying slots game, requiring a contribution per wager of $3×10%=$0.30. Thus, the 100 potential maximum-wager turns of the fixed jackpot slots game will require a maximum bonus play contribution of 100×$0.30=$30.

In this instance, the $50 entrance fee is divided as follows:

| | |
|---|---|
| Tournament organizer's fee: | $5 |
| Bonus play contribution fee: | $30 |
| Prize Money contribution: | $50 − $30 − $5 = $15 |

The bonus play contribution fee is held by the tournament organizer and is used to fund any real-money payouts won by players participating in the tournament. At the end of the tournament, the $30 bonus play contribution fee will have been fully utilized. Each bonus play phase of the game will, besides the real-money payout, also have an equal tournament credit payout in the context of the tournament to advance the player in the tournament rankings for a chance to win a portion of the tournament prize money.

It will be appreciated that the slots tournament may have different parameters to those described above. For example, the tournament may provide for one or more additional real-money payouts according to the pay table, outside of the bonus play phase of the game.

Other Alternatives

As mentioned above, the real money prizes that can be won by tournament participants are not limited to the collective payout contribution fees of all the tournament participants. For example, a real-money prize may not be shared between tournament participants. It is possible for two or more different players to "hit" or win the same real money prize during the course of a tournament and each will win the full amount of that real money prize, e.g., during a bonus play.

In addition, tournament participants and non-tournament participants can play the underlying tournament game at the same time (e.g., the same slots game), irrespective of whether the game is a fixed jackpot, progressive jackpot or wide-area progressive game. However, the tournament participants will use a portion of their respective tournament entry fees to fund the risk of the tournament participants winning the real money prizes that are available to be won during the course of the tournament, whereas non-tournament participants fund the risk of winning real money prizes in a general matter.

Within the examples described above, the present application has been described in the context of a video slots tournament, although the underlying principles have wider applicability. For example, the present application applies equally well to other tournaments that are based on a video poker game as the underlying tournament game, instead of a slots game. Other types of games may also apply.

Further, the electronic multiplayer tournaments to which the present application relates include online tournaments that are played over the Internet, as well as to tournaments that are played in land-based gaming establishments where tournament play takes place on a number of separate gaming machines interconnected by means of a local area network. In this instance, the multiplayer tournament may be deployed as a bank of adjacent player stations, such as in the form of video terminals, each linked to the administration facility by means of a local area network.

Still further, the functions of the server 108 may be divided amongst multiple proprietary servers corresponding to each casino game or casino website managing the tournament. Other servers can be arranged to monitor individual credit account balances of the participating players at the online casino websites and to cause the server 108 to disallow participation in the game of any player whose credit account balance drops below a predetermined minimum threshold.

The server 108 and electronic gaming devices 102 and 104 each may include processors that access memory to execute software functions stored therein to participate in the electronic multiplayer tournaments. The electronic gaming devices 102 and 104 may include any input interface such as those for a standard computer to allow players to participate in the tournaments. In addition, the devices 102 and 104 and the server 108 may include memory, such as random access memory (RAM), or secondary storage, such as read only memory (ROM), optical or magnetic disks, compact-disc read only memory (CD-ROM), or any other volatile or non-volatile storage systems. The memory may store the casino client interface programs, the client process for a particular casino game or other software programs corresponding to the electronic multiplayer tournaments. In turn, the software programs are executable by the processors to play the electronic multiplayer tournaments. As such, the software programs are executable to display the GUI to the players that may be of a standard type of user interface allowing a user to interact with a computer that employs graphical images in addition to text to represent information and actions available to the user. Actions may be performed through direct manipulation of graphical elements, which include windows, buttons, menus, and scroll bars, for example.

It should be further understood that this and other arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

Thus, while the present application has been described in the context of fully functional electronic gaming devices and servers, those skilled in the art will appreciate that mechanisms of the present application are capable of being distributed in the form of a computer-readable medium of instructions in a variety of forms, and that the present application applies equally regardless of the particular type of signal bearing media used to actually carry out the distribution. Examples of such computer-accessible devices include computer memory (RAM or ROM), floppy disks, and CD-ROMs, as well as transmission-type media such as digital and analog communication links.

Since many modifications, variations, and changes in detail can be made to the described embodiments, it is intended that all matters in the preceeding description and shown in the accompanying drawings be interpreted as illustrative and not in a limiting sense. Further, it is intended to be understood that the following clauses further describe aspects of the present application.

(1) A method for facilitating play of an electronic multiplayer tournament in which participating players can win real-money prizes during tournament play, in addition to, overall tournament money prizes, the method comprising:

receiving a tournament entry fee from each player in the electronic multiplayer tournament;

allocating a portion of the tournament entry fee to real money prizes and tournament prize money; and awarding real money prizes and tournament prize money to one or more of the players according to rules of the electronic multiplayer tournament.

(2) The method of clause (1), wherein the real-money prizes include any one or more of a jackpot prize, a progressive jackpot prize or a wide-area progressive jackpot prize.

(3) The method of clauses (1) or (2), wherein the real-money prize is in direct proportion to the probability of the real-money prize being won by a participating player.

(4) The method of clauses (1) or (2), wherein the jackpot prize is a progressive jackpot prize that is funded by a predetermined portion of each eligible wager made by a player of the game.

(5) The method of clauses (1), (2) or (4), wherein the progressive jackpot prize is funded by wagers of players playing the game at a single establishment.

(6) The method of clauses (1), (2), (4) or (5), wherein the progressive jackpot prize is funded by wagers of players playing the same game at competing establishments.

(7) A method for facilitating play of an electronic multiplayer tournament comprising:

receiving a tournament entry fee from each participant in the electronic multiplayer tournament;

dividing the entry fee into a portion for overall tournament prize money and another portion for money prizes awarded during tournament play;

paying out the money prizes awarded during tournament play to players via progressive jackpots; and paying out the overall tournament prize money to top finishers in the electronic multiplayer tournament.

(8) The method of clause (7), wherein at the start of the tournament, each participating player is provided with an identical quantity of tournament credit, which is used as counters to determine winner(s) of the tournament.

(9) The method of clauses (7) or (8), wherein the electronic multiplayer tournament has a duration of a set time period.

(10) The method of clauses (7), (8) or (9), wherein players who have top tournament credit balances are entitled to a share of the overall tournament prize money.

(11) The method of clauses (7), (8), (9) or (10), wherein a portion of the tournament entry fee from each participant is allocated to an organizer of the tournament.

(12) The method of clauses (7), (8), (9), (10) or (11), wherein the portion for money prizes awarded during tournament play constitutes a jackpot prize.

(13) The method of clauses (7), (8), (9), (10), (11) or (12), wherein each time a player makes a qualifying wager, a portion of the tournament entry fee is contributed to the jackpot prize.

(14) The method of clauses (7), (8), (9), (10), (11), (12) or (13), wherein during tournament play, jackpot prizes are paid out to participants who make winning maximum-wager bets.

(15) The method of clauses (7), (8), (9), (10), (11), (12), (13) or (14), wherein an unused portion of the tournament entry fee allocated to the money prizes awarded during tournament play is retained by the tournament organizer.

(16) The method of clauses (7), (8), (9), (10), (11), (12), (13) or (14), wherein an unused portion of the tournament entry fee allocated to the money prizes awarded during tournament play is returned to the participant

(17) The method of clauses (7), (8), (9), (10), (11), (12), (13) or (14), wherein an unused portion of the tournament entry fee allocated to the money prizes awarded during tournament play is added to the overall tournament prize money.

(18) The method of clauses (7), (8), (9), (10), (11), (12), (13) or (14), wherein the electronic multiplayer tournament includes slot machine game play, and wherein a successful spin of the slot machine causes a participant to win the progressive jackpot and also an equal tournament credit payout in the context of the electronic multiplayer tournament to advance in tournament rankings for a chance to win a portion of the overall tournament prize money.

(19) The method of clauses (7), (8), (9), (10), (11), (12), (13), (14) or (18), wherein the slot machine game play includes a 3-reel fixed jackpot slots game, wherein each reel has a number of possible outcomes.

(20) The method of clauses (7), (8), (9), (10), (11), (12), (13), (14), (18) or (19), wherein a participant win real-money during tournament play by receiving any of top results of the slots game.

(21) The method of clauses (7), (8), (9), (10), (11), (12), (13), (14), (18), (19) or (20), wherein the participant wins an amount of real-money corresponding to a percentage payout based on a wager amount and a slot machine reel result.

(22) The method of clauses (7), (8), (9), (10), (11), (12), (13), (14), (18), (19), (20) or (21), wherein the real-money prize is in direct proportion to the probability of the slot machine reel result occurring for the participating player.

(23) The method of clauses (7), (8), (9), (10), (11), (12), (13), (14), (18), (19), (20), (21) or (22), wherein the electronic multiplayer tournament includes a free plays phase of the slots game, in which a participant is not required to make any additional wagers, and wherein all payouts are real-money prizes during a free plays phase.

(24) The method of clauses (7), (8), (9), (10), (11), (12), (13), (14), (18), (19), (20), (21), (22) or (23), wherein a participant can win an opportunity for a free play according to a result of the slot machine reels.

(25) The method of clauses (7), (8), (9), (10), (11), (12), (13), (14), (18), (19), (20), (21), (22), (23) or (24), wherein the electronic multiplayer tournament includes a bonus play phase, in which a participant is not required to make any additional wager, and in which the participant selects one item from n displayed items and wins a randomly-generated payout.

(26) The method of clauses (7), (8), (9), (10), (11), (12), (13), (14), (18), (19), (20), (21), (22), (23), (24) or (25), wherein all payouts are real-money payouts during bonus play phases of the slots game.

(27) A system for providing an electronic multiplayer tournament comprising:

electronic gaming devices that present a display of game-play to players participating in multiplayer tournament games;

a server coupled through a communication network to the electronic gaming devices, wherein the server manages the game-play of the multiplayer tournament games such that players participating in the multiplayer tournament games can win real-money prizes during tournament play, in addition to, overall tournament money prizes at the close of tournament play.

(28) The system of clause (27), wherein the electronic gaming device operate under control of casino client interface programs.

(29) The system of clause (27) or (28), wherein the electronic gaming devices present a graphical user interface (GUI) to the players illustrating the display of game-play.

(30) The system of clause (27), (28) or (29), wherein the GUI illustrates a leader board detailing current rankings of the players in the tournament.

Various embodiments have been described. Those skilled in the art will understand, however, that changes and modifications may be made to the embodiments described without departing from the true scope and spirit of the present invention, which is defined by the following claims.

What is claimed is:

1. A method of managing an electronic multiplayer tournament, comprising the steps of:

at a server, receiving an indication of a receipt of a tournament entry fee from each player in the electronic multiplayer tournament, wherein the electronic multiplayer tournament is conducted through a number of gaming machines interconnected through a network, wherein each gaming machine comprises (i) at least one display device, (ii) a plurality of input devices including (a) an acceptor of a first physical item associated with a first monetary value, (b) a validator configured to identify the first physical item, and (c) a cashout button actuatable to cause an initiation of a payout associated with a credit balance, (iii) at least one gaming machine processor, and (iv) at least one gaming machine memory device storing a plurality of gaming machine instructions executable by the at least one gaming machine processor to make wagers during play of the electronic multiplayer tournament;

the server providing each respective gaming machine corresponding to each player in the electronic multiplayer tournament with tournament credit that is used as counters to determine a winner of the multiplayer tournament, wherein the tournament credit has no monetary value;

the server allocating a portion of the tournament entry fee to real money prizes and tournament prize money, wherein the real money prizes and the tournament prize money have monetary value, wherein the real money prizes and the tournament prize money are separate prize funds;

when a player makes a maximum wager amount during play of the electronic multiplayer tournament through the gaming machine, the server making a contribution from the player's portion of the tournament entry fee allocated for real money prizes to a progressive jackpot prize, wherein the progressive jackpot prize is accumulated from contributions made by wagers through the number of gaming machines interconnected through the network;

the server awarding real money prizes and overall tournament prize money to one or more of the players according to rules of the electronic multiplayer tournament, wherein a real money prize is awarded pursuant to a wager made with tournament credit during a turn of the electronic multiplayer tournament, and wherein the overall tournament prize money is awarded at the close of tournament play; and at the close of the tournament play, if a player's portion for real money prizes contains value, the server adding the value from each player's portion of the tournament entry fee allocated for real money prizes to the overall tournament prize money.

2. The method of claim 1, wherein the electronic multiplayer tournament includes play of a slots game, and wherein the method includes during tournament play, awarding a real money prize to a player if the player obtains at least one predetermined winning result in a turn of the slots game.

3. The method of claim 2, wherein the predetermined winning result in the turn of the slots game causes the player to win a real money prize and tournament credit payout.

4. The method of claim 1, wherein the electronic multiplayer tournament includes play of a slots game, the slots game having a pay table with M entries of winning results, and wherein the method further comprises the step of:

during tournament play, awarding a real money prize to a player if the player wins a result in a turn of the slots game tournament that is one of the top N results in the pay table, where N is an integer of between 1 and 3, and N<M.

5. The method of claim 4, further comprising awarding tournament credit to a player if the player wins a result in a turn of the slots game tournament that is within the M entries of winning results.

6. The method of claim 1, wherein the electronic multiplayer tournament includes play of a slots game, the slots game having a pay table with M entries of winning results, and wherein the method further comprises the step of:

during tournament play, awarding a free play turn to the player if the player wins a result in a turn of the slots game tournament corresponding to a free play payout.

7. The method of claim 6, wherein during a free play, a player is not required to make a wager to initiate a play of the slots game and a free play pay table exists including a payout structure, and the method further comprises:

during a free play, awarding a real money prize to the player if the player wins a result in a turn of the slots game tournament corresponding to a result in the free play pay table.

8. The method of claim 1, wherein the electronic multiplayer tournament includes play of a slots game, the slots game having a pay table with M entries of winning results, and wherein the method further comprises the step of:

during tournament play, awarding a bonus play turn to the player if the player wins a result in a turn of the slots game tournament corresponding to a bonus play payout.

9. The method of claim 8, wherein during the bonus play turn, the player is not required to make a wager to initiate a play of the slots game, and the method further comprises:

during a bonus play turn, the player selecting one item from n displayed items; and awarding a real money prize having an amount corresponding to a randomly-generated payout.

10. A method of facilitating play of game involving an electronic multiplayer tournament format, the method comprising:

at a server, receiving an indication of a receipt of tournament entry fee from each player in the electronic multiplayer tournament, wherein the electronic multiplayer tournament is conducted through a number of gaming machines interconnected through a network, wherein each gaming machine comprises (i) at least one display device, (ii) a plurality of input devices including (a) an acceptor of a first physical item associated with a first monetary value, (b) a validator configured to identify the first physical item, and (c) a cashout button actuatable to cause an initiation of a payout associated with a credit balance, (iii) at least one gaming machine processor, and (iv) at least one gaming machine memory device storing a plurality of gaming machine instructions executable by the at least one gaming machine processor to make wagers during play of the electronic multiplayer tournament;

the server providing each respective gaming machine corresponding to each player in the electronic multiplayer tournament with tournament credit that is used as counters to determine a winner of the electronic multiplayer tournament, wherein the tournament credit has no monetary value;

the server allocating a portion of the tournament entry fee for overall tournament prize money, wherein the overall tournament prize money has monetary value;

the server allocating a portion of the tournament entry fee for real-money prizes awarded during tournament play, wherein the real-money prizes have monetary value, wherein the real money prizes and the overall tournament prize money are separate prize funds;

during tournament play, the server identifying players in the electronic multiplayer tournament meeting requirements to receive at least one real-money prize awarded during the tournament play, wherein a real money prize is awarded pursuant to a wager made with tournament credit during a turn of the electronic multiplayer tournament; and at the close of tournament play, the server identifying players in the electronic multiplayer tournament meeting requirements to receive a portion of the overall tournament prize money, wherein the step of allocating the portion of the tournament entry fee for real-money prizes awarded during tournament play comprises the steps of:

allocating a predetermined maximum amount of the tournament entry fee from each player toward real-money prizes awarded during tournament play;

when a player makes a maximum wager amount during play of the electronic multiplayer tournament through the gaming machine, making a contribution from the player's allocated predetermined maximum amount to a progressive jackpot thereby lowering a value of the player's allocated predetermined maximum amount, wherein the progressive jackpot prize is accumulated from contributions made by wagers through the number of gaming machines interconnected through the network; and at the close of the tournament, if a player's allocated predetermined maximum amount of the tournament entry fee contains value, returning the value from each player's predetermined maximum amount to each respective player.

11. The method of claim 10, further comprising during tournament play, providing an indication of the at least one real-money prize awarded during tournament play to the players in the electronic multiplayer tournament identified as meeting the requirements.

12. The method of claim 10, further comprising at the close of tournament play, providing an indication of the portion of the overall tournament prize money to the players in the electronic multiplayer tournament identified as meeting the requirements.

13. The method of claim 10, wherein the electronic multiplayer tournament comprises a slots game tournament, the slots game tournament having a pay table with M entries of winning results, and wherein the method further comprises the step of:

during tournament play, awarding a real money prize to a player if the player wins a result in a turn of the slots game tournament that is one of the top N results in the pay table, where N is an integer of between 1 and 3, and $N<M$.

14. The method of claim 10, wherein the electronic multiplayer tournament includes game play involving slot machines, and the method further comprising a successful spin of the slot machine causing a player to win at least one real-money prize during the tournament play, and a tournament credit payout in the context of tournament rankings corresponding to a chance to win a portion of the overall tournament prize money.

15. The method of claim 10, wherein the real-money prize awarded during tournament play is the progressive jackpot prize funded by a predetermined portion of the allocated portion of the tournament entry fee for real-money prizes awarded during tournament play.

16. The method of claim 10, wherein the electronic multiplayer tournament includes play of a slots game, and wherein the electronic multiplayer tournament includes a free plays phase of the slots game in which a player is not required to make any additional wagers, and wherein all payouts are real-money prizes during the free plays phase.

17. The method of claim 10, wherein the electronic multiplayer tournament includes play of a slots game, and wherein the electronic multiplayer tournament includes a bonus play phase of the slots game in which a player is not required to make any additional wagers, and in which the player selects one item from n displayed items and wins a randomly-generated payout, wherein all payouts are real-money payouts during the bonus play phases of the slots game.

18. A computer readable medium containing program code for causing a processor to execute the method of claim 10.

19. A method of conducting play of game involving an electronic multiplayer tournament format, the method comprising:

at a server, receiving an indication of a receipt of tournament entry fee from each player in the electronic multiplayer tournament, wherein the electronic multiplayer tournament is conducted through a number of gaming machines interconnected through a network, wherein each gaming machine comprises (i) at least one display device, (ii) a plurality of input devices including (a) an acceptor of a first physical item associated with a first monetary value, (b) a validator configured to identify the first physical item, and (c) a cashout button actuatable to cause an initiation of a payout associated with a credit balance, (iii) at least one gaming machine processor, and (iv) at least one gaming machine memory device storing a plurality of gaming machine instructions executable by the at least one gaming machine processor to make wagers during play of the electronic multiplayer tournament;

the server allocating a portion of the tournament entry fee from each player for overall tournament prize money;

the server allocating a portion of the tournament entry fee from each player for real-money prizes awarded during tournament play, the portion for real-money prizes further used to make contributions to a progressive jackpot prize, wherein the progressive jackpot prize is accumulated from contributions made by wagers through the number of gaming machines interconnected through the network;

when a player makes a maximum wager amount during play of the electronic multiplayer tournament through the gaming machine, the server making a contribution from the player's portion of the tournament entry fee allocated for real-money prizes awarded during tournament play to the progressive jackpot prize; and at the close of the tournament play, if a player's portion for real-money prizes contains value, the server returning the value from each player's portion of the tournament entry fee allocated for real-money prizes awarded during tournament play to each respective player.

20. The method of claim 19, wherein the portion of the tournament entry fee allocated for real-money prizes awarded during tournament play is a maximum amount of the tournament entry fee that a player may contribute toward the real-money prizes awarded during tournament play.

21. The method of claim 19, further comprising during tournament play, identifying players in the electronic multiplayer tournament meeting requirements to receive at least one real-money prize during the tournament play.

22. The method of claim 19, further comprising at the close of tournament play, identifying players in the electronic multiplayer tournament meeting requirements to receive a portion of the overall tournament prize money.

23. The method of claim 19, further comprising during tournament play, providing an indication of the at least one real-money prize awarded during tournament play to the players in the electronic multiplayer tournament identified as meeting the requirements.

24. The method of claim 19, further comprising at the close of tournament play, providing an indication of the portion of the overall tournament prize money to the players in the electronic multiplayer tournament identified as meeting the requirements.

25. A computer readable medium containing program code for causing a processor to execute the method of claim 19.

26. A server for managing an electronic multiplayer tournament, the server comprising:

a first program code causing a server to receive a tournament entry fee from each player in the electronic multiplayer tournament, wherein the electronic multiplayer tournament is conducted through a number of gaming machines interconnected through a network, wherein each gaming machine comprises (i) at least one display device, (ii) a plurality of input devices including (a) an acceptor of a first physical item associated with a first monetary value, (b) a validator configured to identify the first physical item, and (c) a cashout button actuatable to cause an initiation of a payout associated with a credit balance, (iii) at least one gaming machine processor, and (iv) at least one gaming machine memory device storing a plurality of gaming machine instructions executable by the at least one gaming machine processor to make wagers during play of the electronic multiplayer tournament;

a second program code causing a server to provide respective gaming machine corresponding to each player in the electronic multiplayer tournament with tournament credit that is used as counters to determine a winner of the multiplayer tournament, wherein the tournament credit has no monetary value;

a third program code causing a server to allocate a portion of the tournament entry fee to real money prizes and tournament prize money, wherein the real money prizes and the tournament prize money have monetary value, wherein the real money prizes and the tournament prize money are separate prize funds;

a fourth program code causing a server to make a contribution from the player's portion of the tournament entry fee allocated for real money prizes to a progressive jackpot prize when a player makes a maximum wager amount during play of the electronic multiplayer tournament, wherein the progressive jackpot prize is accumulated from contributions made by wagers through the number of gaming machines interconnected through the network;

a fifth program code causing a server to award real money prizes and tournament prize money to one or more of the players according to rules of the electronic multiplayer tournament, wherein a real money prize is awarded pursuant to a wager made with tournament credit during a turn of the electronic multiplayer tournament, and wherein the tournament prize money is awarded at the close of tournament play; and a sixth program code causing a server to return the value from each player's portion of the tournament entry fee allocated for real money prizes awarded during tournament play to each respective player at the close of the tournament play if a player's portion for real money prizes contains value.

27. A system for providing an electronic multiplayer tournament comprising:

electronic gaming devices that present a display of gameplay to players participating in multiplayer tournament games, wherein each gaming device comprises (i) at least one display device, (ii) a plurality of input devices including (a) an acceptor of a first physical item associated with a first monetary value, (b) a validator configured to identify the first physical item, and (c) a cashout button actuatable to cause an initiation of a payout associated with a credit balance, (iii) at least one gaming device processor, and (iv) at least one gaming device memory device storing a plurality of gaming device instructions executable by the at least one gaming device processor to make wagers during play of the electronic multiplayer tournament; and a server coupled through a communication network to the electronic gaming devices, wherein the server manages the game-play of the multiplayer tournament games such that players participating in the multiplayer tournament games can win real-money prizes during tournament play in addition to overall tournament money prizes at the close of tournament play, wherein the players submit a tournament entry fee, wherein a portion of each player's tournament entry fee is allocated for the real-money prizes and the tournament prize money, wherein the real money prizes and the tournament prize money have monetary value and are separate prize funds, wherein the multiplayer tournament games include electronic multiplayer slots tournaments and at the start of tournament play the server provides each participating player with tournament credit that is used as counters to determine winner(s) of the slots tournaments, wherein the tournament credit has no monetary value, wherein within a particular slot tournament a maximum wager on a slot machine made by a player causes the server to make a contribution from the player's portion of the tournament entry fee allocated for real-money prizes to a jackpot prize accumulated from contributions made by wagers through the electronic gaming devices coupled through the communication network, wherein within a particular slot tournament a successful wager on a slot machine using tournament credit causes a player to win real-money prizes during tournament play and a tournament credit payout increasing the player's chance to win at least a portion of the overall tournament money prizes, and wherein a player's portion of the tournament entry fee allocated for real-money prizes is returned to the player if the player's portion of the tournament entry fee allocated for real-money prizes contains value at the close of the tournament play.

28. The system of claim 27, wherein the electronic multiplayer tournament includes a network-based tournament, wherein each player has a personal credit account, and wherein real money prizes awarded to a player are added to the player's personal credit account.

* * * * *